United States Patent
Hsiang (10) Patent No.: US 10,867,056 B2
(45) Date of Patent: Dec. 15, 2020

(54) METHOD AND SYSTEM FOR DATA PROTECTION

(71) Applicant: iDGate Corporation, New Taipei (TW)

(72) Inventor: Ke-Hsi Hsiang, New Taipei (TW)

(73) Assignee: IDGATE CORPORATION, New taipei (TW)

( * ) Notice: Subject to any disclaimer, the term of this patent is extended or adjusted under 35 U.S.C. 154(b) by 396 days.

(21) Appl. No.: 15/866,565

(22) Filed: Jan. 10, 2018

(65) Prior Publication Data

US 2018/0225467 A1   Aug. 9, 2018

(30) Foreign Application Priority Data

Feb. 6, 2017   (TW) .............................. 106103820 A (51) Int. Cl.
| | |
|---|---|
| *H04L 29/06* | (2006.01) |
| *G06F 21/62* | (2013.01) |
| *H04L 9/08* | (2006.01) |
| *G06F 21/73* | (2013.01) |
| *G06F 21/32* | (2013.01) |
| *H04L 9/32* | (2006.01) |

(52) U.S. Cl.
CPC .............. *G06F 21/62* (2013.01); *G06F 21/32* (2013.01); *G06F 21/6209* (2013.01); *G06F 21/73* (2013.01); *H04L 9/08* (2013.01); *H04L 9/0822* (2013.01); *H04L 9/0866* (2013.01); *H04L 9/3231* (2013.01)

(58) Field of Classification Search
CPC ...... G06F 21/62; G06F 21/32; G06F 21/6209; G06F 21/73; H04L 9/08; H04L 9/0822; H04L 9/0866; H04L 9/3231; H04L 63/062
See application file for complete search history.

(56) References Cited

U.S. PATENT DOCUMENTS

| | | | |
|---|---|---|---|
| 6,944,760 | B2 | 9/2005 | Wills |
| 7,225,331 | B1 | 5/2007 | McBrearty et al. |
| 7,272,231 | B2 | 9/2007 | Jonas et al. |

(Continued)

FOREIGN PATENT DOCUMENTS

| | | | |
|---|---|---|---|
| CN | 101174953 A | | 5/2008 |
| CN | 102111271 A | | 6/2011 |

(Continued)

*Primary Examiner* — Yogesh Paliwal
(74) *Attorney, Agent, or Firm* — Li & Cai Intellectual Property (USA) Office (57) ABSTRACT

The disclosure relates to a method and a system for data protection. The system provides a key server and a software sequence executed in a user device. The software sequence renders the method. In the method, a user value associated with a user's registered data in the key server is provided according to the user's input data; a server value is generated by the key server when the key server identifies the user; and a device value is generated according to the hardware information of the user device. The data in the user device can be effectively protected by an encryption process using the user value, the server value and the device value. A data protection mechanism with high-level security can be achieved when the data is protected in the encryption process incorporating the user-related user value, the device-related device value, and the server-related server value.

19 Claims, 11 Drawing Sheets

(56) References Cited

U.S. PATENT DOCUMENTS

| | | | |
|---|---|---|---|
| 2012/0144198 A1* | 6/2012 | Har | H04W 12/0609 |
| | | | 713/170 |
| 2013/0275754 A1* | 10/2013 | Kuang | H04L 63/06 |
| | | | 713/168 |

FOREIGN PATENT DOCUMENTS

| | | | |
|---|---|---|---|
| CN | 103888938 A | 6/2014 | |
| CN | 104660397 A | 5/2015 | |
| CN | 105308616 A | 2/2016 | |
| TW | 201351194 A | 12/2013 | |
| TW | 201415282 A | 4/2014 | |
| TW | 201435642 A | 9/2014 | |
| TW | 201504835 A | 2/2015 | |
| TW | 201629835 A | 8/2016 | |

* cited by examiner

METHOD AND SYSTEM FOR DATA PROTECTION

BACKGROUND OF THE INVENTION

1. Field of the Invention

The disclosure is generally related to a method for data protection, and in particular to a method and a system for encrypting data based on a user's input user value, a device-related device value, and a server-generated server value.

2. Description of Related Art

Data protection has always been an important topic in the field of information industry, especially for sensitive information. The sensitive information such as user's account data, a key for certificate signature, or data is used to authenticate the user. Hence, when the sensitive information is saved in a computer device, protective measures are necessary to be adopted.

The protective measures of data protection can be a digital certificate that is provided by a third Certificate Authority Center, and the digital certificate is used to be a digital signature or a key for encryption or decryption. The digital certificate is also used to tighten up the data security when the data is transmitted over a network. Even if a file signed with the digital certificate is stolen, the file cannot be read without the digital certificate.

In the conventional technology, various security measures for data protection have been provided. The data protection scheme may require a user to enter security data such as password or biometric feature. The security data may be used to encrypt a file, and the encrypted file is saved in a specific space of the compute device. Even if the file is hacked, no correct file can be read without the user's security data. For example, an encryption-decryption sequence executed in a computer can be used to assist the user to enter the requisite personal security data when a file needs to be protected. The personal security data, such as a password or fingerprints, can form a seed for the encryption-decryption sequence. The encryption-decryption sequence requires the seed to be inputted to a specific encryption algorithm that rearranges the file to an unrecognizable value. The seed is again used to decrypt the file by a decryption algorithm with the user's personal security data. Finally, the file can be recovered.

SUMMARY OF THE INVENTION

The present disclosure is related to a method and a system for data protection. Three types of security codes are particularly introduced to be the basis for data protection. The three types of security codes adopted by the system for data protection include a user value that is inputted by a user, a device value that is related to the device hardware, and a server value that is provided by a server. The present disclosure is advantageous to provide the high-level security protection for data. More specifically, the user-related user value, the device-related device value, and the server-related server value form the requisite keys to access the data. It should be noted that the server value is provided when the user is successfully identified. Moreover, in the method for data protection, none of the security codes is stored in the user-end device so that potential risks of the security code being hacked can be reduced.

In one of the embodiments of the present disclosure, the method for data protection is performed by an encryption-decryption process executed by a user device. Both the encryption and decryption processes are symmetric processes for strengthening the data protection.

In the user device, an input process is performed to obtain the user value. The user value forms a user ID provided for a key server. The user ID is transmitted to the key server. The key server identifies the user according to the user ID and accordingly generates the server value. The server value is then sent back to the user device. The encryption-decryption sequence is used to scan the hardware information of the user device so as to obtain the device value. Different types of data can be protected in the user device through the user value, the device value and the server value.

Furthermore, an encryption and decryption program initiates an input interface in the user device. The user can input a security code via the input interface. The security code can be a password or biometric information rendered by fingerprints or other biometric features. The security code renders the content for identifying the user.

In another embodiment, when the biometric information is adopted by the method, the biometric information forms a biological characteristic value. The biological characteristic value forms the user value. Alternatively, when the user device adopts the approach of the biometric identification, the biometric information assists the user device to complete an authentication. An authentication result is formed and transmitted to the key server. The key server computes the user value when the authentication result corresponds to a user ID. The key server then generates the user value and the server value. Both the user value and the server value are transmitted to the user device.

According to yet another embodiment, the server value generated by the key server can be a fixed key or a dynamic key pair including a first key and a second key. Both the first key and the second key are transmitted to the user device. The first key is available for the user device to decrypt the data, and unavailable after the first key is used to decrypt the data. The second key is used to encrypt the data when the user device has used the data. The second key is not stored in the user device. After that, the user device transmits the identification data to the key server and shows a decryption request. The second key is converted into a next first key that is used to decrypt the data. In the meantime, the key server dynamically generates a next second key.

In the other embodiments, the system for data protection mainly includes the mentioned key server that provides a database used to record user IDs of users and identification data with respect to every user ID. The encryption and decryption program is installed in the user device and executed by one or more processors for performing the method for data protection.

DETAILED DESCRIPTION OF THE PREFERRED EMBODIMENTS

The present invention will now be more fully described hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The disclosure is related to a method and a system for data protection. The system for data protection provides a server, namely a key server that is used to provide a server value allowing a user to access protected data. The server value is such as a key. A user value is provided for the protection of data. The user value is data based on a user's input data via a user interface. The user value is such as a personal identification number (PIN) or other types of security codes. The security code can be the user's biometric features such as fingerprints, an iris or a face managed by a specific biological technology. The system for data protection utilizes an encryption and decryption program executed in the user device to scan hardware information of the user device. A device value associated with the hardware information of the device is therefore generated. Consequently, there are three types of security codes such as the server-based server value, the device-based device value and the user-based user value that are incorporated in the method for data protection for achieving the high-level security for the data protection.

It should be noted that the inventive scope of the present disclosure may not be limited to any type of the user value. More specifically, the user value is generated by a specific algorithm based on the user's input data. The user value can also be provided by the server when the user has been authenticated in the server. The device value may indicate the specific hardware information determined by the user. The server value can be an invariable key provided by the key server when a registration procedure is completed. The server value can be a one-time value that is generated dynamically. The server value can be a key pair including a first key and a second key.

Figure 1:
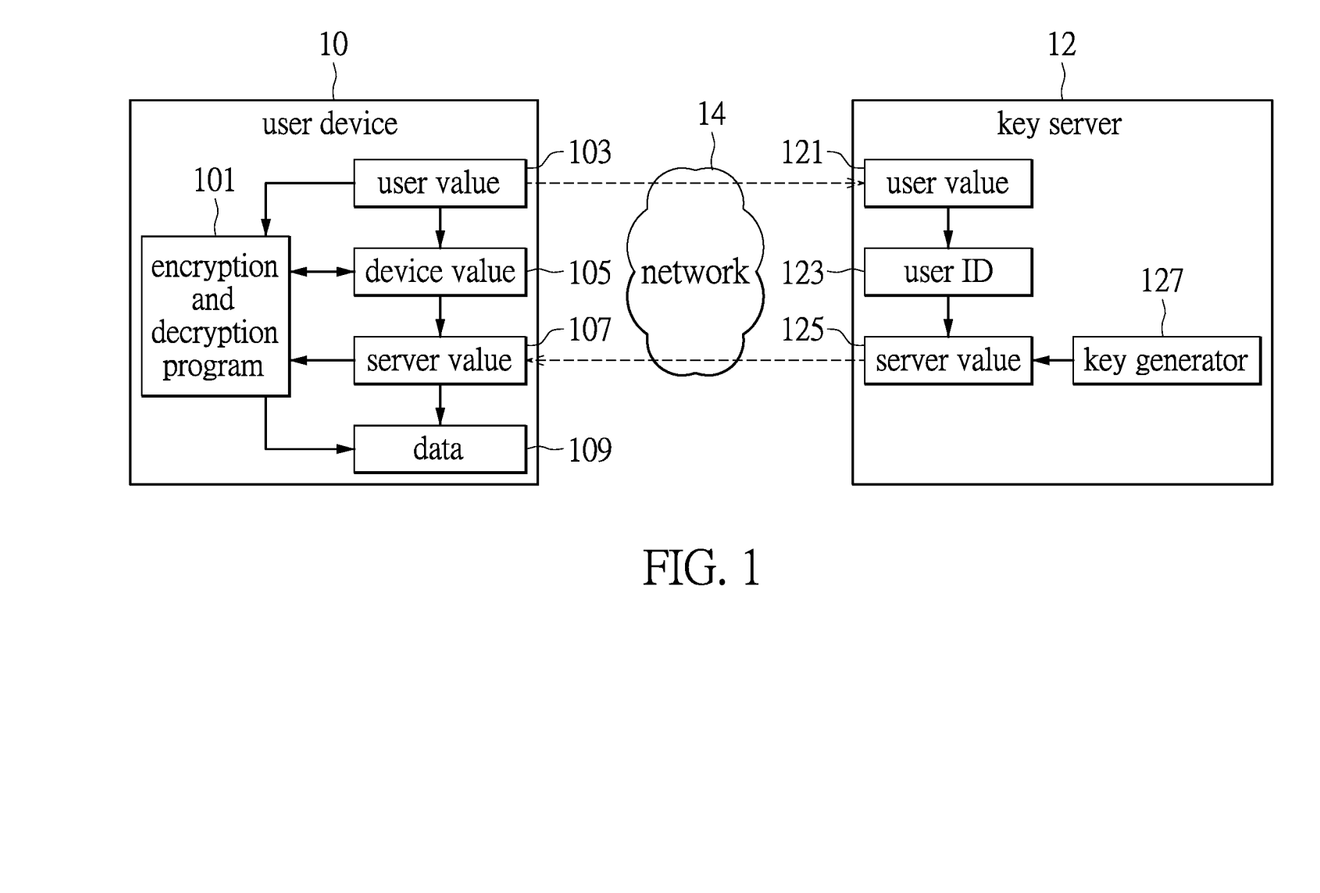
FIG. 1 shows a schematic diagram depicting a system for data protection according to one embodiment of the present disclosure.

Reference is made to FIG. 1 which shows a schematic diagram depicting the system for data protection in one embodiment of the present disclosure. The system includes a user device 10 and a key server 12 that are interconnected over a network. The key server 12 is in charge of generating a server value 125.

An encryption and decryption program 101 is installed in the user device 10. The encryption and decryption program 101 acts as a software sequence that implements the method for data protection. The encryption and decryption program 101 may not be a single program, but a set of function routines. A user value 103, which is one of the security codes used to protect data 109, is inputted by a user via an input interface initiated by the encryption and decryption program 101. In an exemplary embodiment, the user value 103 can be a PIN that can be the security code set up by the encryption and decryption program 101 when the program 101 is initially installed in the user device 10. The user value 103 can be updated when the encryption and decryption program 101 is reinstalled or reset in the user device 10. The user value 103 is relevant to the user. Further, the user value 013 can be the identification data acting as the user ID provided for the key server 12 to identify the user.

In one aspect, the user value 103 can be formed by the user's biometric information rendered by the user's fingerprints, iris or face. The image related to the biometric information can be analyzed to be used as the biological characteristic value. The characteristic value can be the user value 103. The user value 103 can be computed by a specific algorithm based on the biological characteristic value. The user value 103 also becomes the identification data provided to the key server 12 to authenticate the user.

In another aspect, the user inputs a string via an input interface. The string can act as the user value, or the string becomes the user value with other processing procedures. For example, the string can be part of the value of the hardware information of the user device, and the information renders the user value. The biological characteristic value can also be the string rendered by the biometric information. The biological characteristic value can act as the user value. The biological characteristic value can also form the user value through a specific calculation. For example, the biological characteristic value can be predetermined to correspond to partial hardware information of the user device, and the corresponding part becomes the user value.

It is noted that the user value generated through the aforementioned approaches are based on the information about the user, including the user's biometric features, or passwords in the user's memory.

Further, the encryption and decryption program 101 scans hardware of the user device 10 and obtains the hardware information of the user device 10. Part or all of the hardware information would become the device value 105. This device-related device value 105 allows the data 109 to be accessible only in the same user device. The data 109 is protected or encrypted in the user device 10, and only decrypted in the same user device 10 and accessible to the user. Consequently, even though the data 109 is stolen, it cannot be read in other devices other than the user device 10.

When the encryption and decryption program 101 obtains the user-related information, such as the user value 103, the user value 103 is transmitted to the key server 12 over a network 14. The transmission can be encrypted or undergo a hash operation. The user value 103 becomes the user value 121 that is used to authenticate the user when the key server 12 receives the user value 103 from the user device 10. While the user value 103 is compared to the data with respect to the user ID in the key server 12, the key server 12 can identify the user ID 123. A key generator 127 of the key server 12 is used to generate a server value 125 through a specific algorithm. The server value 125 is sent back to the user device 10 over the network 14, and forms a server value 107 in the user device 10.

According to one of the embodiments, the data 109 in the user device 10 is protected through the user-related user value 103, the hardware-related device value 105 and the server value 107 generated when the key server 12 successfully authenticates the user. The encryption and decryption program 101 encrypts the data 109 and generates a specific value through an encryption process. The data 109 can be regenerated based on the corresponding user value 103, the device value 105 and the server value 107. The method tightens up the security on the data protection mechanism.

Figure 2:
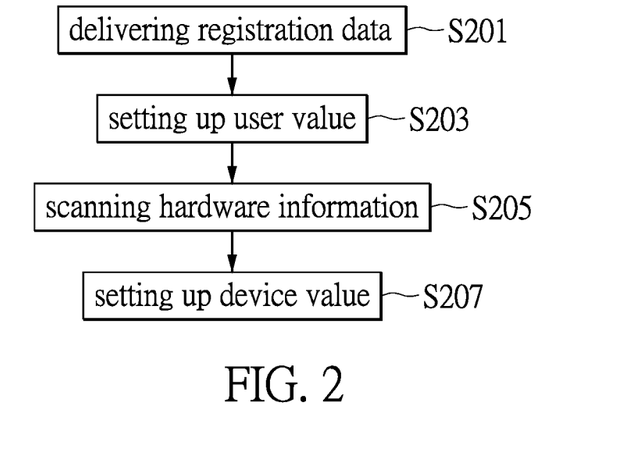
FIG. 2 shows a flow chart describing a process for setting up an encryption-decryption value in the method for data protection according to one embodiment of the present disclosure.

Before operating the method for data protection, the user is required to apply for a service from a server. Reference is made to FIG. 2 showing a flow chart for registering the service in a key server.

In the method, such as in step S201, the user transmits registration data including user's data and account to the key server. In step S203, a user value is generated by the user through an interaction with the key server. For example, the user can set up a PIN to be the user value, or use the biological characteristic value to be the user value through a specific algorithm. The user value acts as a user ID for the key server to identify the user. In the registration process, the key server generates a server value according to the user value.

The encryption and decryption program, such as in step S205, initially scans the device in order to obtain hardware information. In step S207, the hardware information is referred to setting up a device value that is one of the security codes.

The encryption and decryption program executed in the user device protects the data based on the user value, the device value and the server value provided by the key server when it successfully authenticates the user. It should be noted that in one aspect these three types of security codes including the user-related user value, the device-related device value and the server-related server value are not stored in any memory of the user device for the sake of information security.

Figure 3:
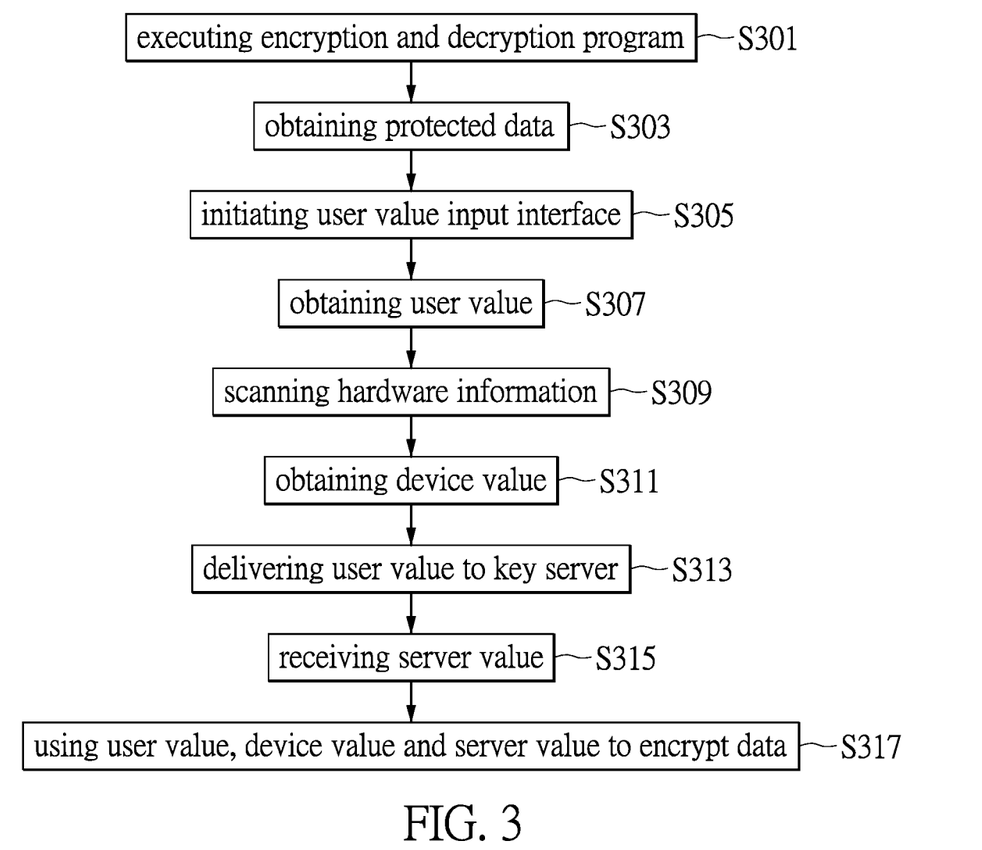
FIG. 3 shows a flow chart describing the method for data protection according to one embodiment of the present disclosure.

FIG. 3 shows another flow chart describing an encryption process in the method for data protection according to one embodiment of the present disclosure. The method for data protection is implemented by an encryption and decryption process in the user device. A symmetric encryption-decryption process would be introduced to the data protection. The method is exemplified as the following steps, and the order of steps can be reasonably exchanged.

In step S301, an encryption and decryption program is executed by one or more processors of the user device. The program can be initiated by the user when he wants to encrypt data. In step S303, the user selects a file of data to be protected. In the meantime, in step S305, the encryption and decryption program performs an input procedure that initiates an input interface allowing the user to input value for forming a user value. For example, an input field can be initiated in the user device, and the user enters information in the input field. Alternatively, the program may prompt the user to use the biological recognition technology to obtain biometric features, for example scanning fingerprints, photographing the face, or scanning the iris. The method for data protection does not exclude employing any other biological recognition technology other than the aforementioned technologies.

After that, in step S307, the encryption and decryption program obtains the user value, e.g. a string of PIN, the biological characteristic value or a value rendered based on the biometric features. In step S309 which can be simultaneously processed with the above steps, the program scans hardware information of the user device. Part or all of the hardware information form a device value, such as in step S311.

In step S313, the encryption and decryption program transmits identification data rendered by the user value to a key server. The identification data can be the user value or the other information available to identify the user ID. The information available to identify the user can be the hardware information when it has been registered in the key server. The key server then authenticates the user based on the information transmitted from the user device. When the user is successfully authenticated by the key server, a server value is generated through a specific algorithm, such as in step S315. The encryption and decryption program then receives the server value.

After that, in step S317, the encryption and decryption program encrypts the data using the user value, the device value and the server value. The encrypted data is stored in a specific space of the storage of the user device.

Figure 4:
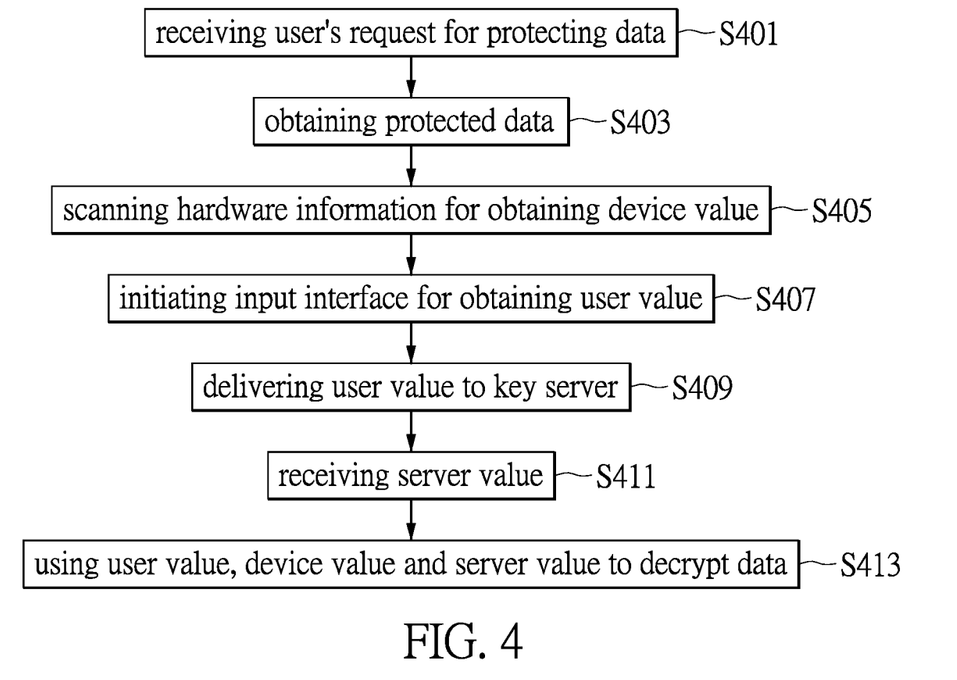
FIG. 4 shows a flow chart describing a process for decrypting data in the method for data protection according to one embodiment of the present disclosure.

When the user wants to access the file of the protected data, the encryption and decryption program is again executed to receive this request for accessing the data. The encryption and decryption program retrieves the data using an opposite decryption process. Reference is made to FIG. 4 showing a flow chart describing a decryption process in the method for data protection according to one of the embodiments of the present disclosure.

In step S401, the encryption and decryption program receives a request for accessing the protected data made by a user. The request can be received from other applications for another purpose of using the data. For example, the data to be protected can be a seed that is used in an authentication process. When the user is required to be authenticated in a specific application, the seed needs to be taken for generating authentication data. The seed can be protected by an encryption process described in FIG. 3 after the seed has been used.

In step S403, the encryption and decryption program retrieves the protected data from a memory space. The encryption and decryption program, in step S405, scans the hardware information of the user device. A device-related device value is generated. In step S407, the encryption and decryption program initiates an input interface that allows the user to enter a PIN or biometric information for generating a user value. The user value can be personal identification data or a biological characteristic value. The user value may also be a security code generated by a calculation procedure based on the user's input data. The user value acts as the identification data provided for the key server to authenticate the user. In step S409, the identification data is transmitted to the key server, the key server generates a server value based on the user value when he has been authenticated. The server value is transmitted to the user device. In step S411, the encryption and decryption program receives the server value. In step S413, the data can be accessed in a decryption process by using the user value, the device value and the user value.

Figure 5A:
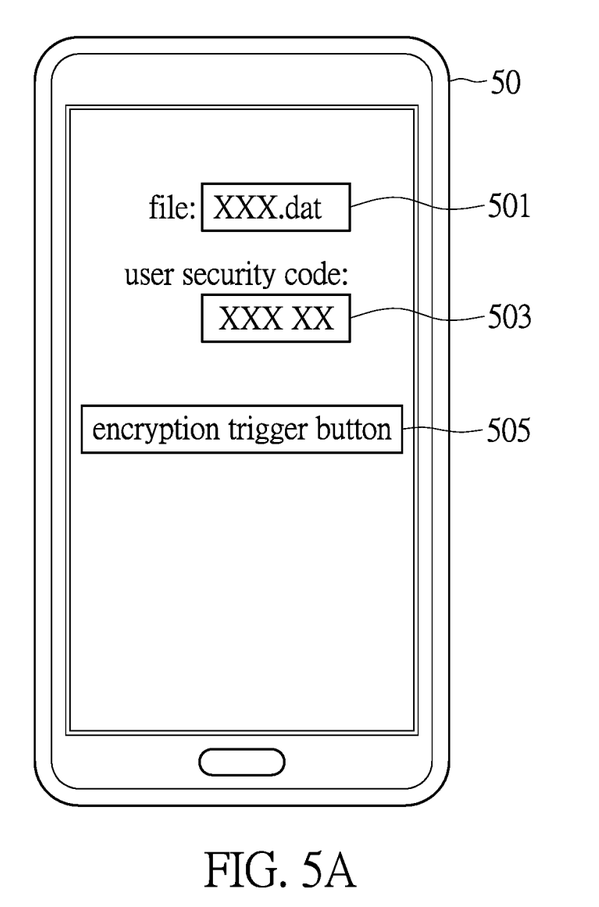
FIG. 5A to FIG. 5C are the schematic diagrams depicting the decryption data in a user device in the method for data protection according to one embodiment of the present disclosure.
Figure 5B:
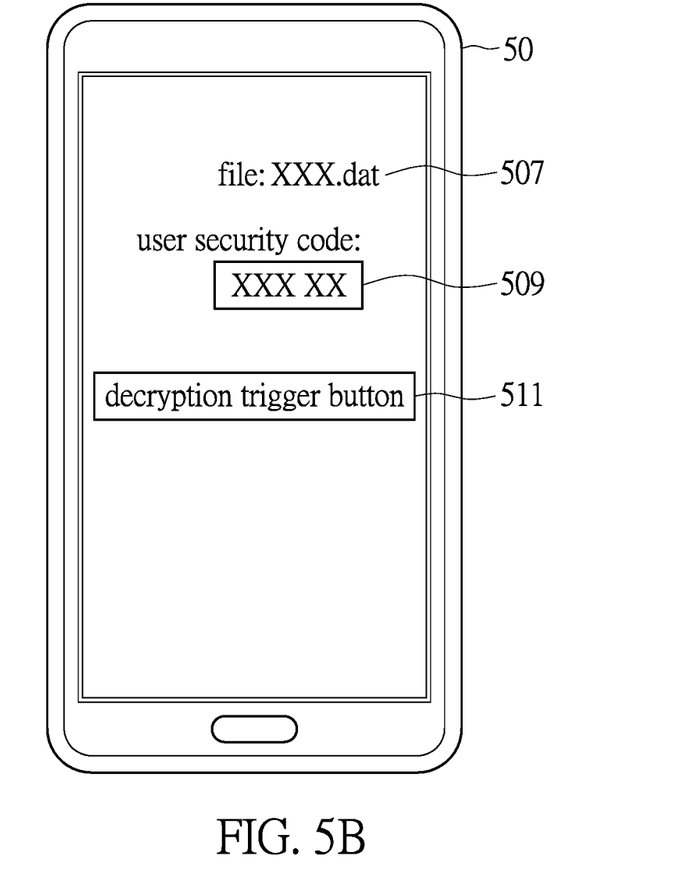
Figure 5C:
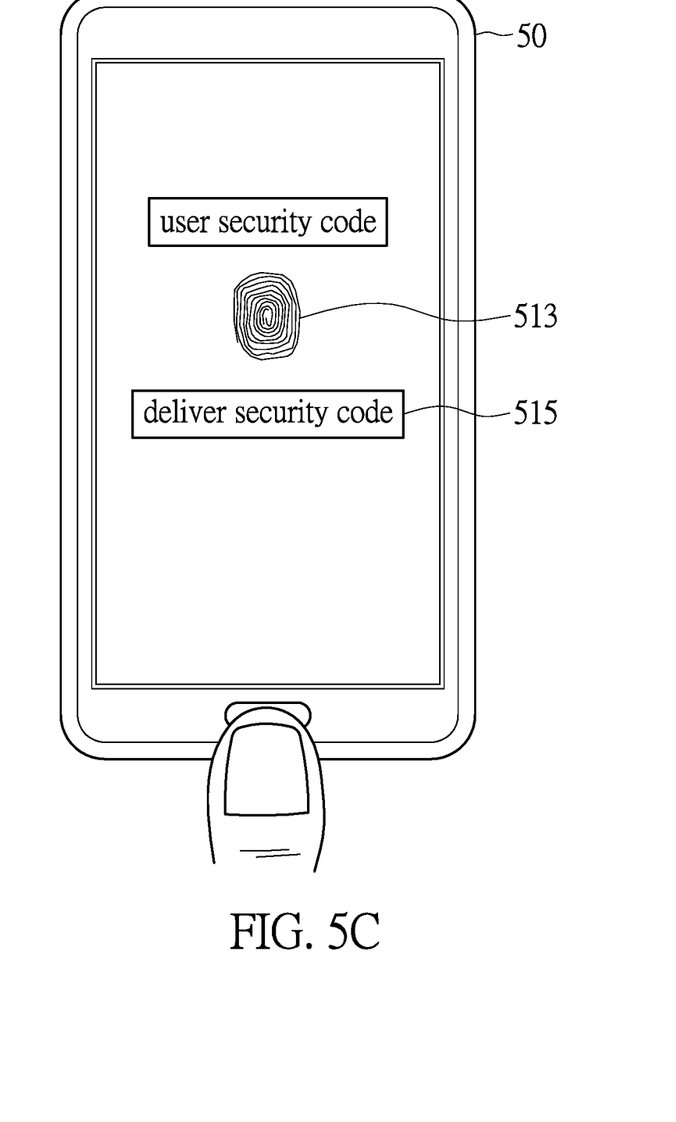

FIG. 5A to FIG. 5C show the schematic diagrams depicting the circumstance using the user device to conduct the method for data protection.

A user device 50 can be portable computer devices such as a mobile phone or a tablet computer shown in FIG. 5A. The portable computer device acts as a device rendering personalized data. For example, the hardware information of the user device 50 represents a personalized feature that is appropriate to be a security code for data protection.

The data to be protected is such as a file 501 stored in a memory of the user device 50. An encryption and decryption program executed in the user device 50 is used to encrypt the file 501. An input interface is provided for the user to enter a security code 503. The security code 503 is such as a PIN. When the user presses an encryption trigger button 505, the encryption and decryption program scans the hardware information of the user device 50 in a background sequence. A device value can be obtained. The user value is transmitted to the key server so as to obtain a server value after the user has been authenticated. The file 501 can be encrypted based on the user value, the device value and the user value.

FIG. 5B shows a file 507 that is required to be protected. The encryption and decryption program receives an instruction to retrieve the file 507 when a decryption trigger button 511 is pressed by the user. The encryption and decryption program can also respond to a decryption request made by other applications. A decryption process is therefore performed. The encryption and decryption program initiates an input interface that allows the user to enter a security code 509 such as a PIN or biometric information. A user value is formed. A device value can also be obtained instantly in a background sequence. A server value can be obtained from the key server. The file 507 can be decrypted based on the user value, the device value and the server value.

FIG. 5C shows a flow chart describing the method for data protection using a biological recognition technology. The encryption and decryption program prompts the user to read his/her biometric features. An input interface shown in the diagram prompts the user to input his/her security code 513, e.g. the user's fingerprints. A biological characteristic value can be computed so as to form a user value. The security code is transmitted by pressing a trigger button, e.g. the deliver security code button 515. The security code, i.e. the user value, is transmitted to the server. A server value can be obtained from the server. The user value, the device value and the server value are used to perform an encryption process for data protection.

The server value provided by the key server is generated when the server receives the identification data from the user device. In the key server, the identification data is compared with the data regarding the registered users in a database. In one embodiment, when a user ID is confirmed, the key server provides an invariable key that is generated in a registration procedure. The invariable key acts as the server value and is transmitted to the user device. In one embodiment, the key server provides a one-time key that is dynamically generated.

Figure 6:
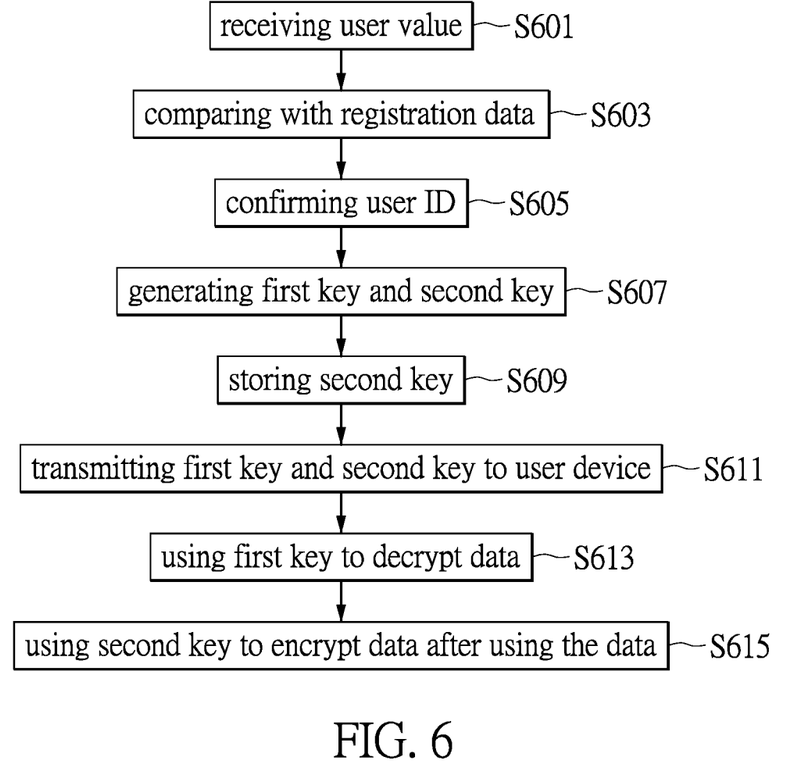
FIG. 6 shows a flow chart describing a server value generated in the method for data protection according to one embodiment of the present disclosure.

Reference is made to FIG. 6 showing a flow chart describing generating the server value in the method for data protection in one embodiment.

In step S601, a key server receives a user value from a user device. The user value acts as the information to identify the user. The user value can be a PIN, a biological characteristic value or any type of identification data that is set up in a registration procedure. The key server compares the registration data in a database with the user value, such as in step S603. A user ID can be confirmed through the comparison in step S605.

In the step of confirming the user ID, an encryption and decryption program executed in the user device verifies the security code inputted by the user. A result is generated after the verification. If the verification fails, the procedure is interrupted because the user is an identified user. If the verification passes, the result renders the identification data that is transmitted to the key server. The key server acknowledges the verification result. The identification data is used to compare with the registration data, in step S603. A user ID can be confirmed in step S605. In one embodiment, the PIN is such as the user's password that corresponds to all or part of the hardware information of the user device. Therefore, the hardware information of the user device becomes the basis of authenticating the user in the key server.

When the mentioned steps for data protection were performed after the registration, the server value generated by the key server, the user value and the device value are used to encrypt data in the user device. The server value is not stored in any memory of the user device, but in the key server. The server value is not provided to anybody until a next request for decrypting the data is generated. When the key server confirms the user ID, the server value used for encryption process in the previous use is provided for the user device to decrypt the data. The server value can be an invariable key and only stored in the server. In one embodiment, the server value can be a pair of keys, e.g. a first key and a second key. In an exemplary embodiment, the first key is used to decrypt the file and unavailable after the decryption process. The second key is used to encrypt the file when the file has been used. The file is protected again.

In the method, when the user wants to access the protected file, the user enters a security code. The security code forms a user ID for identifying the user in the key server. A first key and a second key corresponding to the user ID are generated in step S607 after the key server confirms the user ID. In step S609, only the second key is stored in the key server. It is noted that the second key is used to encrypt the data in the current procedure, but it becomes a first key that is used to decrypt the protected data in the next procedure. In the meantime, the key server regenerates another second key.

In the current procedure, in step S611, the key server transmits both the first key and the second key to the user device. In step S613, the encryption and decryption program executed in the user device uses the first key to decrypt the protected data. The first key is unavailable after the decryption process. In step S615, after the data has been used, the encryption and decryption program uses the second key to encrypt the used data. The second key is also unavailable and not stored in the user device after the encryption process. However, the second key is stored in the key server ready for the next decryption process, in step S609.

In the present embodiment, the method for data protection utilizes an encryption algorithm and a decryption algorithm to implement the data protection. The server value includes a first key and a second key that are generated dynamically after the user has been authenticated. In particular, the first key and the second key provide different functions at different stages. The first key is provided for the user device to decrypt the data and unavailable after the decryption process. The second key is provided for the user device to re-encrypt the data when the data is re-protected after the decryption process. Therefore, the data can be protected and re-encrypted with different encryption values since the second key is changed in every encryption process. This mechanism strengthens the security in data protection since the encrypted value changes in the encryption process.

Further, in this mechanism, the second key is stored in the key server but not stored in the user device. When the user device requests for data decryption, the previous second key can be retrieved from the key server. The previous second key then becomes a first key for performing the data decryption. In the meantime, the key server generates a new second key for the next data encryption.

Figure 7:
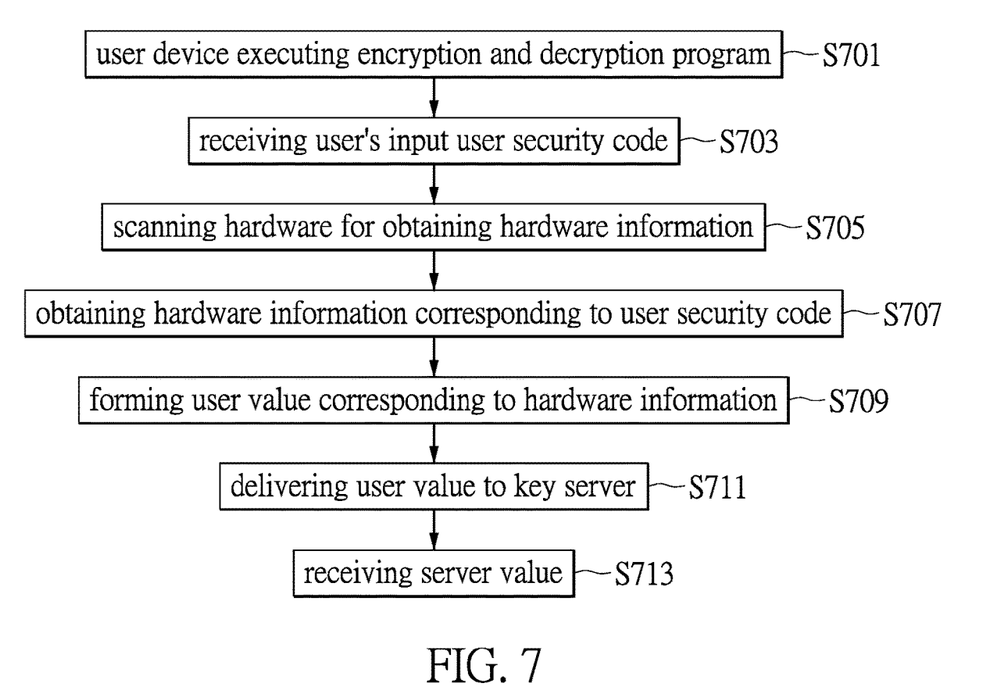
FIG. 7 shows a flow chart describing a user value generated in the method for data protection according to one embodiment of the present disclosure.

FIG. 7 shows a flow chart describing a scheme to generate the user value in the method for data protection in one embodiment of the present disclosure.

In the present embodiment, in step S701, an encryption and decryption program is executed in a user device. In step S703, an input interface is initiated in the user device for receiving a security code inputted by a user. The security code is such as a PIN. In step S705, the encryption and decryption program scans hardware information of the user device. In step S707, the encryption and decryption program obtains the hardware information corresponding to the security code by referring to a predetermined lookup table. In an exemplary example, the hardware information is in the form of a string that can be the values in multiple fields of the lookup table. The security code can also be a string that corresponds to the multiple fields of the lookup table. In step S709, the hardware information corresponding to the security code can be obtained in order to form a user value.

The user value is then transmitted to the key server, such as in step S711. The key server authenticates the user based on the user value. In the initial registration process, the user sets up the user value that corresponds to the hardware information of the user device through a specific program, e.g. the encryption and decryption program, and the hardware information corresponding to the user value is registered in the key server. The user value is not necessary to be registered in the key server.

After that, the key server confirms a user ID and generates a server value, such as in step S713. The user device then receives the server value.

Figure 8:
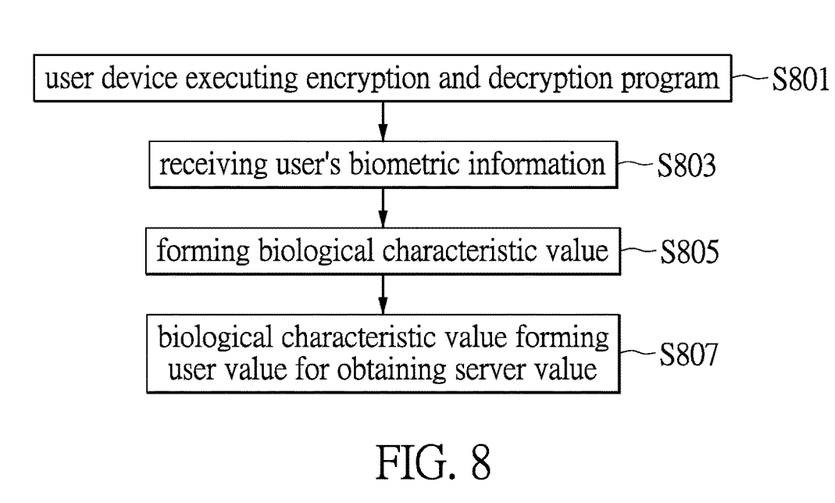
FIG. 8 shows another flow chart describing the user value generated in the method for data protection according to one embodiment of the present disclosure.

The user value can be biometric information. According to the process shown in FIG. 8, in step S801 the user device executes an encryption and decryption program. An input interface is initiated for the user to enter biometric information. In step S803, the encryption and decryption program receives the user's biometric information, e.g. the image information of fingerprints, an iris, or a face. In step S805, the biometric information is analyzed to form a biological characteristic value. The biological characteristic value can be the identification data registered in the key server in an initial stage. The identification data acts as the user ID for identifying the user. In step S807, the encryption and decryption program forms a user value based on the biological characteristic value, and the user value is transmitted to the key server for obtaining a server value.

Figure 9:
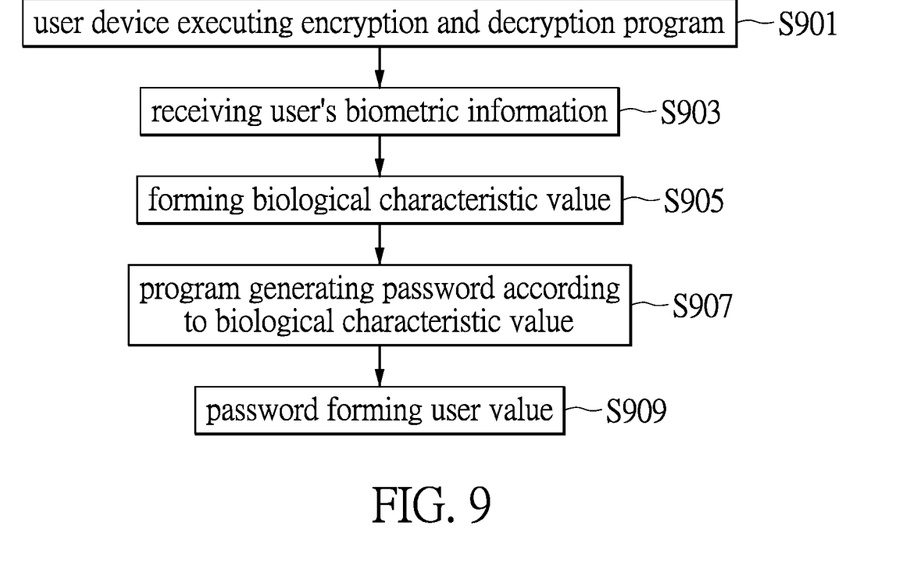
FIG. 9 shows still another flow chart describing the user value generated in the method for data protection according to one embodiment of the present disclosure.

A further flow chart shown in FIG. 9 describes another embodiment of forming the user value.

In step S901, an encryption and decryption program is executed in the user device. In step S903, an input interface is initiated by the encryption and decryption program in order to receive user's biometric information. In step S905, the biometric information can be converted into a biological characteristic value through an image processing. In step S907, the encryption and decryption program in response to the biological characteristic value performs an initial authentication process in the user device. After the encryption and decryption program confirms the user to be identical to a registered user, the encryption and decryption program generates a password. This password can be a user value that is initially registered in the key server in the registration process, such as in step S909.

Figure 10:
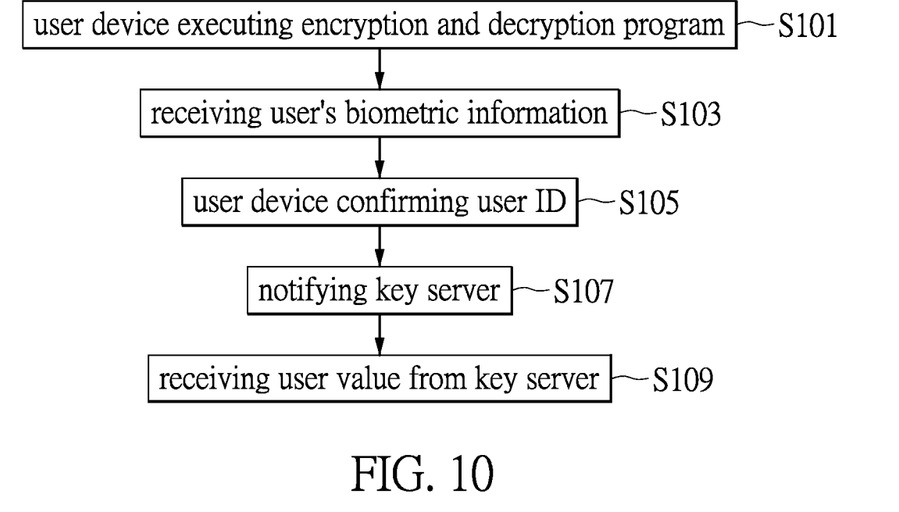
FIG. 10 shows the other flow chart describing the user value generated in the method for data protection according to one embodiment of the present disclosure.

According to the previous embodiment, a user value can be obtained through an input procedure. The user value acts as the identification data provided for the key server to authenticate the user. In addition to obtaining the user value via the input interface, the user value can be obtained based on the biological characteristic value through a computation. FIG. 10 shows another flow chart describing a process for generating the user value in one embodiment of the present disclosure.

According to the present embodiment, in step S101, an encryption and decryption program is executed in the user device. In step S103, user's biometric information is received. In the meantime, in step S105, the encryption and decryption program confirms the user ID based on the biometric information. When the user is successfully authenticated by the user device, an authentication result is generated. Identification data is formed due to the successful authentication. In step S107, a key server is notified. Unlike the aforementioned approaches to generating the user value by the user device, the present embodiment shows that the key server identifies the user based on the authentication result and the user ID rendered by the identification data. A user value can be generated in the key server according to the user ID. In step S109, the encryption and decryption program receives the user value from the key server. On the other hand, the key server generates a server value after the user has been authenticated.

Similarly, the encryption and decryption program uses the user value provided by the key server, the device value and the server value to protect the data.

Figure 11:
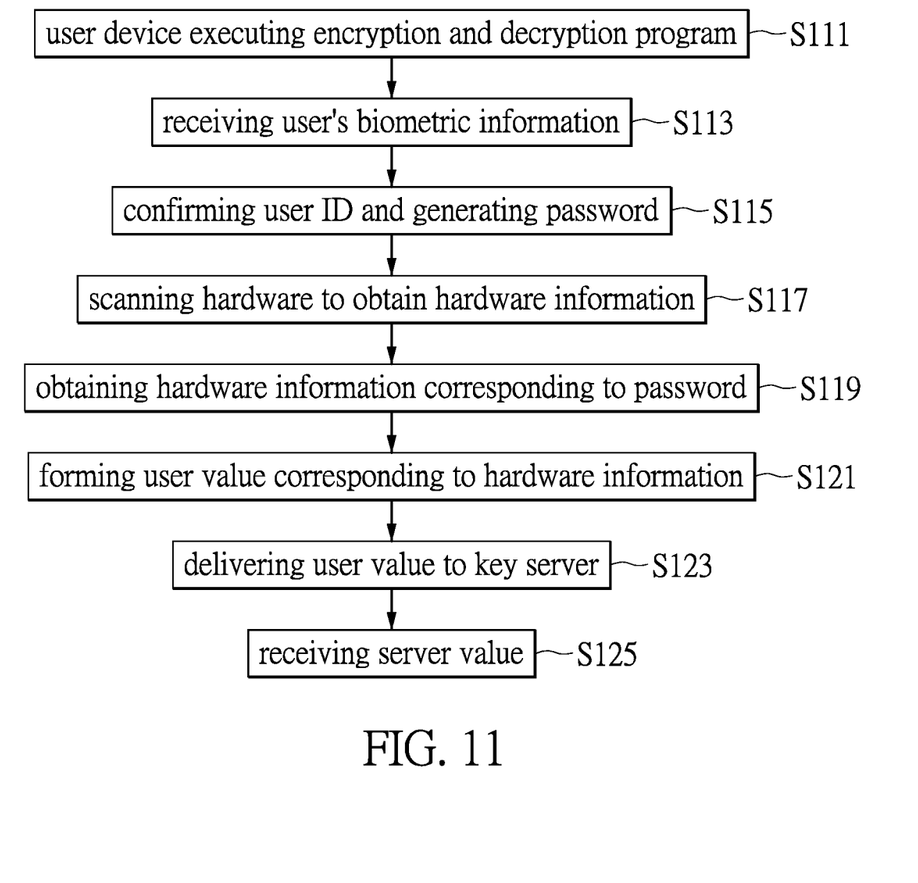
FIG. 11 shows the other flow chart describing the user value generated in the method for data protection according to one further embodiment of the present disclosure.

Reference is next made to FIG. 11 showing another flow chart describing generating a user value in the method for data protection in one embodiment of the present disclosure.

In step S111, an encryption and decryption program is executed in a user device. In step S113, the encryption and decryption program receives biometric information via an input interface. In the user device, the program confirms a user ID in response to the biometric information. In step S115, a password is generated when the user ID has been confirmed.

In step S117, the encryption and decryption program scans the hardware of the user device for obtaining hardware information. A device value is therefore generated. The password acts as a user value for the data protection. In step S119, the hardware information corresponding to the password can act as the user value that is also the identification data for identifying the user. In step S121, the user value associated with the hardware information is transmitted to the key server. In step S123, the key server compares the received user value with the data related to the user value registered in the key server. A user ID can be confirmed. A server value can be generated. The server value is then transmitted to the user device. In step S125, the user device receives the server value. After that, the user value, the device value, and the server value are used to protect the data.

For implementing the method for data protection, a system is provided. The system includes a key server including a database. The database records a plurality user IDs and the identification data with respect to every user. The identification data renders the user value directly or forms the user value through a computation. Further, the user value can be formed when the encryption and decryption program executed in the user device has authenticated the user ID.

The system provides the encryption and decryption program installed in the user device. The program is stored in a memory of the user device. The encryption and decryption program is executed by one or more processors of the user device for performing the method for data protection according to various embodiments of the present disclosure.

Figure 12:
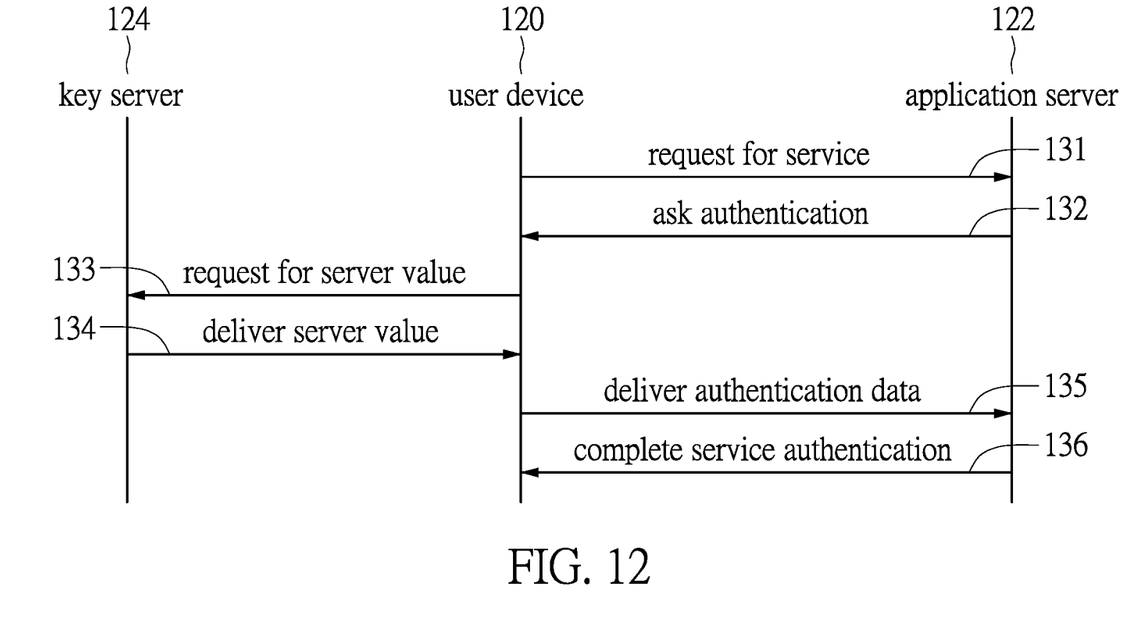
FIG. 12 shows a flow chart describing the method for data protection according to one embodiment of the present disclosure.

The method for data protection is featured that the high-level security can be provided. The method is especially applied to the sensitive data that requires the high-security protection. The sensitive information, such as a seed, is referred to performing the authentication process for authenticating a user. The sensitive information is such as a security certificate or a key. FIG. 12 shows a flow chart describing the method for data protection according to one embodiment of the present disclosure.

In an exemplary embodiment, a user wants to access a service provided by an application server 122 through a user device 120. The service can be an online transaction. The application server 122 asks for the user to process an authentication procedure. Therefore, a key or a seed for performing the authentication process is retrieved from the user device 120. The sensitive data for the authentication in the method for data protection is originally protected in a memory of the user device 120. When the data, e.g. the key or the seed, is asked to be retrieved from the memory of the user device 120, a user value, a device value and a server value provided by the key server 124 are required to obtain the data as described in the aforementioned embodiments.

In step 131, the user device 120 requests for a service from the application server 122. The application server 122 then responds to this request. In step 132, the application server 122 asks for user authentication. For example, the application server 122 asks for authentication data from the user device 120 to identify the user. The authentication data can be generated based the seed retrieved from the memory of the user device. The authentication data is provided for the application server 122 to authenticate the user.

The program in the user device 120 retrieves the data, e.g. the seed, to be protected. A user value can be formed in the user device 120 based on the user's input data. The key server 124 receives an authentication result from the user device 120 when the user has been authenticated in the user device. The key server 124 also receives a device value associated with the hardware information of the device. When the user value is transmitted to the key server 124 for requiring a server value, such as in step 133, the key server 124 authenticates the user ID and generates the server value. In step 134, the server value is transmitted to the user device 120.

After that, the program executed in the user device 120 uses the user value, the device value and the server value to retrieve the data, e.g. the seed. The seed allows the program to generate authentication data that is transmitted to the application server 122, such as in step 135. After the application server 122 authenticates the user, the user device 120 is notified to complete the service authentication, such as in step 136. The user is authorized to use the following services.

In the user device 120, the seed is re-protected in the memory of the user device. The encryption and decryption program may be executed again and uses the user value, the device value and the service value obtained from the key server 124 to protect the seed.

The various aspects, embodiments, implementations or features of the invention can be used separately or in any combination. The advantages of the invention are numerous. Different embodiments or implementations may, but need not, yield one or more of the following advantages. The method and the system for data protection are disclosed. To protect data, three types of security codes, e.g. a user-related user value, a hardware-related device value, and a server-related server value, are introduced to an encryption process or a decryption process. The advantage of the present disclosure is that the method provides the high-level security for data protection since none of the security codes is stored in the user-end device, so that potential risks of the security code being hacked or stolen can be reduced.

It is intended that the specification and depicted embodiments be considered exemplary only, with the true scope of the invention being determined by the broad meaning of the following claims.

What is claimed is:

1. A method for data protection, comprising:
in one user device, receiving a user value from a key server, wherein, when authenticating a user of the user device, an authentication result forms an identification data that is transmitted to the key server so as to generate the user value that is associated with a user's registered data stored in the key server;
scanning hardware information of the user device for forming a device value;
receiving a server value from the key server, wherein the key server generates the server value when the key server identifies the user in response to the identification data transmitted from the user device, and sends the server value back to the user device; and
in the user device, protecting data by an encryption process based on the user value transmitted from the key server, the device value obtained instantly and the server value transmitted from the key server.

2. The method as recited in claim 1, wherein the user device executes an encryption and decryption program that is used to initiate an input interface for receiving a string or biometric information in which the identification data is formed.

3. The method as recited in claim 2, wherein the encryption and decryption program is used to scan the hardware information of the user device and form the device value based on all or part of the hardware information.

4. The method as recited in claim 2, wherein the biometric information is authenticated in the user device and the authentication result is obtained.

5. The method as recited in claim 2, wherein the string directly forms the user value or forms the user value through a calculation procedure.

6. The method as recited in claim 5, wherein the identification data transmitted to the key server acts as the user value or a value computed based on the user value, and the key server generates the server value after a user is authenticated.

7. The method as recited in claim 6, wherein the server value is an invariable key generated by the key server in a registration procedure.

8. The method as recited in claim 6, wherein, an encryption algorithm is used to protect the data; the server value includes a one-time first key and a one-time second key after the user has been authenticated; the first key is unavailable after the first key is used to decrypt the data in the user device, and the second key is used to encrypt the data after the data has been used in the user device; the second key is stored in the key server rather than in the user device, and is retrieved by the user device from the key server in a next request for decrypting the data; the second key becomes a next first key and the key server generates another second key next time.

9. The method as recited in claim 2, wherein the string corresponds to part of the hardware information of the user device, and the string is used to form the user value.

10. The method as recited in claim 2, wherein the biometric information is used to form a biological characteristic value that is used to form the user value.

11. The method as recited in claim 2, wherein the biometric information is referred to forming a biological characteristic value that corresponds to the hardware information of the user device, and part of the hardware information is used to form the user value.

12. The method as recited in claim 1, wherein the server value generates a first key and a second key in response to the identification data transmitted by the user device; the first key is unavailable after the first key is used to decrypt the data in the user device, and the second key is used to encrypt the data after the data has been used in the user device; the second key is stored in the key server rather than in the user device, and is retrieved by the user device from the key server in a next request for decrypting the data; the second key becomes a next first key and the key server generates another second key next time.

13. A system for data protection, comprising:
a key server including a database that records user IDs of a plurality of users and identification data with respect to every user ID;
a memory of a user device, wherein the user device is connected with the key server over a network, wherein the memory stores an encryption and decryption program that is executed by one or more processors of the user device for performing a method for data protection comprising:
receiving a user value from the key server, wherein, when authenticating a user of the user device, an authentication result forms an identification data that is transmitted to the key server so as to generate the user value that is associated with a user's registration data stored in the key server;
scanning hardware information of the user device for forming a device value;
receiving a server value from the key server, wherein the key server generates the server value when the key server identifies the user in response to the identification data transmitted from the user device, and sends the server value back to the user device; and
in the user device, protecting data by an encryption process based on the user value transmitted from the key server, the device value obtained instantly and the server value transmitted from the key server.

14. The system as recited in claim 13, wherein the encryption and decryption program initiates an input interface that is used to receive a string or biometric information in which the identification data is formed; the encryption and decryption program is used to scan hardware information of the user device and form the device value based on all or part of the hardware information; the encryption and decryption program protects the data by incorporating the user value, the device value and the server value.

15. The system as recited in claim 14, wherein the biometric information is authenticated in the user device and the authentication result is obtained.

16. The system as recited in claim 14, wherein the identification data transmitted to the key server acts as the user value or a value computed based on the user value, and the key server generates the server value after a user has been authenticated.

17. The system as recited in claim 16, wherein the server value is an invariable key generated by the key server in a registration procedure.

18. The system as recited in claim 16, wherein, an encryption algorithm is used to protect the data; the server value includes a one-time first key and a one-time second key after the user has been authenticated; the first key is unavailable after the first key is used to decrypt the data in the user device, and the second key is used to encrypt the data after the data has been used in the user device; the second key is stored in the key server rather than in the user device, and is retrieved by the user device from the key server in a next request for decrypting the data; the second key becomes a next first key and the key server generates another second key next time.

19. The system as recited in claim 13, further comprising an application server, when the user device requests a service to the application server, the application server asking the user device to perform authentication, and the user device executing the encryption and decryption program for retrieving the user value, the device value and the server value in order to protect the data; an authentication data generated and transmitted to the application server for authenticating a user; wherein the steps for retrieving the data comprise:
receiving the user value through the input procedure, and the user value forming identification data provided for the key server;
scanning hardware information of the user device for forming the device value;
receiving the server value from the key server, wherein the key server generates the server value in response to the identification data transmitted from the user device, and sends the server value back to the user device; and
retrieving the data by a decryption process based on the user value, the device value and the server value.

* * * * *